Nov. 20, 1962 D. C. APLIN 3,064,486
VARIABLE SPEED DRIVE MECHANISMS
Filed Dec. 28, 1961 2 Sheets-Sheet 1
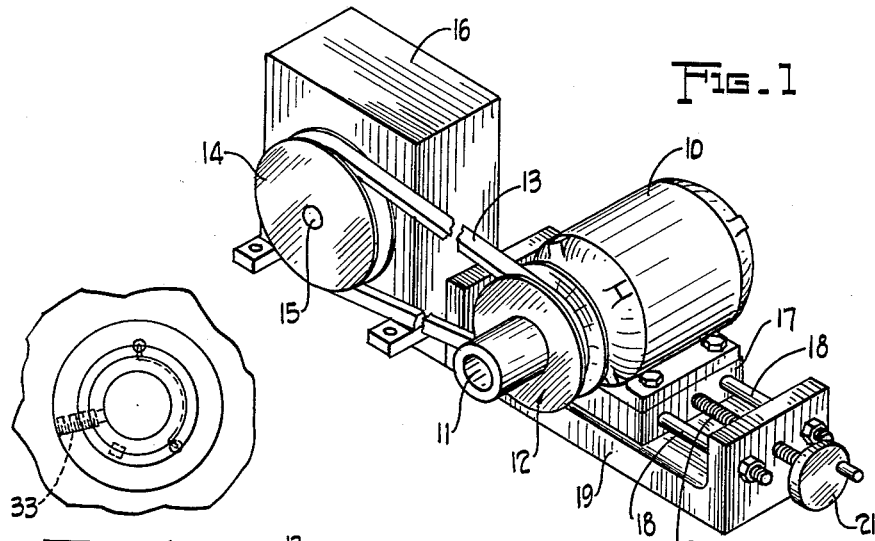
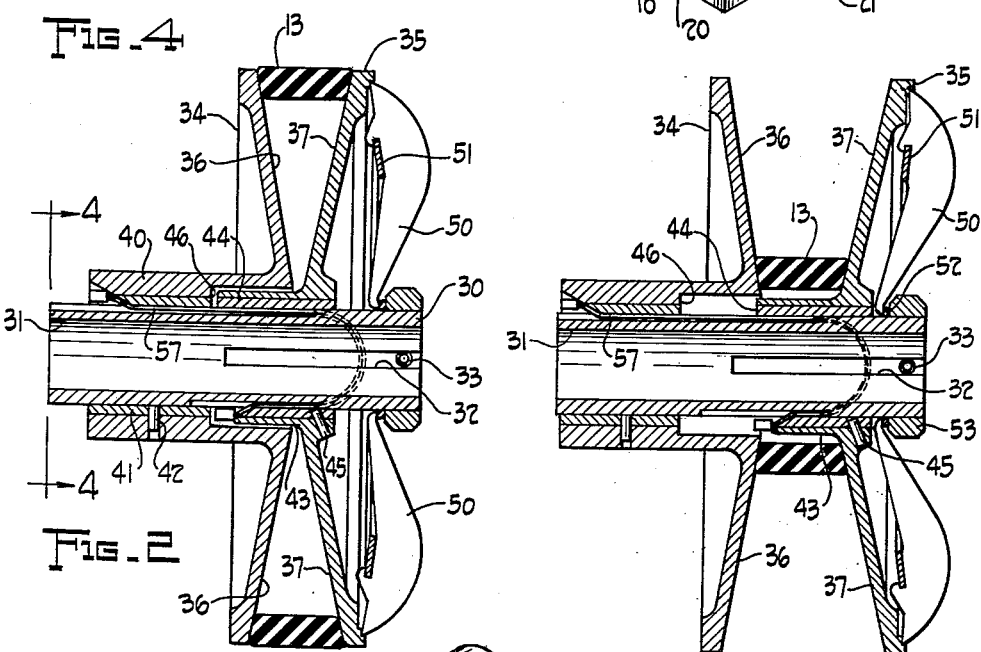
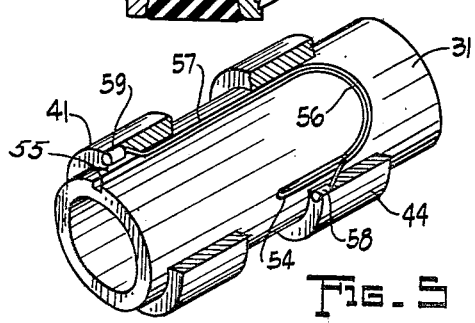
INVENTOR.
DENIS C. APLIN
BY Watts & Fisher
ATTORNEYS.

Nov. 20, 1962

D. C. APLIN 3,064,486

VARIABLE SPEED DRIVE MECHANISMS

Filed Dec. 28, 1961

INVENTOR.
DENIS C. APLIN
BY Watts & Fisher
ATTORNEYS.

United States Patent Office 3,064,486
Patented Nov. 20, 1962

3,064,486
VARIABLE SPEED DRIVE MECHANISMS
Denis C. Aplin, Chagrin Falls, Ohio, assignor to
Speed Selector Inc.
Filed Dec. 28, 1961, Ser. No. 162,645
8 Claims. (Cl. 74—230.17)

This invention relates generally to variable speed drive mechanisms, and more specifically to new and improved variable pitch pulley constructions in which the relative axial spacing of the pulley halves is adjustable for varying the speed of the pulleys.

In power drive systems of the type having driving and driven pulleys operatively connected by a belt, it is conventional to employ pulley structures having adjustable pulley diameters so that a variation in the speed ratio of the pulleys can be obtained. Usually, such a pulley structure has a pair of opposed cone discs or pulley halves which cooperate with a V-belt, the variation in effective pitch diameter being obtained by adjusting the axial spacing of the pulley halves. Thus, by moving the pulley halves close together, the belt is caused to move radially outwardly along the conical faces of the pulley halves, thereby producing an increased pitch diameter. Conversely, when the pulley halves are drawn apart, the belt moves radially inwardly along the faces of the pulley halves to decrease the effective pitch diameter.

As will be recognized by those skilled in the art, an important problem associated with adjustable pulley structures as generally described above is that of maintaining the belt in driving alignment between the driving and driven pulleys. For example, in the most widely known construction, one pulley half is fixed on the pulley shaft and the other half is axially movable on the shaft. Consequently, when the movable pulley half is adjusted, the belt will shift laterally as it is moved along the conical surface of the fixed pulley half. Unless compensation is made for this lateral shifting of the belt and consequent misalignment, the belt will be subject to severe wear in operation.

When using an adjustable pulley having a fixed half and a movable half, compensation is made for the lateral shifting of the belt by employing a flat wide companion pulley. The purpose of the flat wide pulley is to permit the belt to align itself thereon after adjustment of the pitch diameter of the cooperating pulley. However, this system is bulky and does not provide for positive alignment of the belt. Moreover, good traction cannot be obtained since the flat wide pulley is engaged by the bottom of the belt instead of by its sides.

In order to prevent belt misalignment and, at the same time, to avoid the disadvantages of using a flat wide companion pulley, several different types of variable pitch pulley constructions have been evolved in the past in which both pulley halves of the pulley are adjustable on the pulley shaft. One such construction includes a rack and pinion. A rack is attached to each pulley half for imparting a positive motion in equal and opposite directions. Although operative for its intended purpose, this construction is expensive and is subject to severe wear. Moreover, the rack and pinion do not permit the use of a pulley shaft having a through bore.

Another conventional adjustable pulley construction includes a cam for mechanically actuating the pulley halves toward or away from one another during adjustment of the pitch diameter of the pulley. This structure is also subject to severe wear and is complicated and expensive. Again, the structure does not permit the use of a pulley shaft having a through bore.

A related prior art construction for actuating the pulley halves toward and away from each other embodies the use of a cam which utilizes the torque reaction of the pulley halves to maintain them in correct axially spaced positions. Equal face movement of the pulley halves is achieved by connecting the halves together so that one cannot rotate with respect to the other and so that, when one pulley half rides up on its cam, the other pulley half will do the same. This construction is complicated and expensive, and, unless relatively massive in size, it is not reliable. Moreover, a portion of the torque loading is reflected in the axial loading on the belt which is sometimes detrimental to belt life.

In still another conventional variable pitch pulley construction, each pulley half is loaded by a coil spring carried on the adjacent end of the pulley shaft. The centering of the pulley halves is accomplished through the difference in spring pressures when one spring is compressed to a greater deflection than the other by the belt being off-center. This construction does not provide a practical and completely positive manner of centering the pulley halves on the shaft, since springs having a very high spring rate must be used to obtain any substantial centering force at small deflections from the center of the shaft. The resulting build-up in spring pressure is a disadvantage since the belt is subjected to severe wear. Consequently, such a system has not been widely used.

An object of the present invention is to provide a variable pitch pulley construction which is operative to automatically maintain proper driving alignment of the associated belt drive at all speeds.

A more specific object of the invention is to provide a variable pitch pulley construction in which both pulley halves are adjustable toward and away from each other in equal and opposite increments of sliding movement.

A further object of the invention is to provide a variable pitch pulley as generally described above which is simple and inexpensive in construction and which has a long life.

Still another object of the invention is to provide a variable pitch pulley construction including opposed pulley faces which are axially adjustable in equal and opposite directions on a pulley shaft having a through bore.

In general, the foregoing objects of the invention are attained and the disadvantages of the prior art overcome by a variable pitch pulley construction having a hollow shaft and a pair of opposed pulley halves mounted on the shaft for axial sliding movement. One of the pulley halves may be spring loaded so that it is urged toward the center of the shaft. The spring loaded pulley half is connected to the other pulley half by a novel force-transmitting structure for effecting equal and opposite movement of the other pulley half during adjustment of the effective pitch diameter of the pulley.

According to the preferred embodiment of the invention, this force-transmitting structure comprises a cable which is carried in a guide channel formed in the shaft. The guide channel has a reverse bend between its ends. When one pulley half is moved toward one end of the shaft, the cable is slidably drawn through the channel around the reverse bend to pull the other pulley half in the opposite direction.

According to a modification of the preferred structure, the guide channel has one leg portion extending from beneath the spring loaded pulley half toward the opposite pulley half and a circumferentially spaced leg portion extending from the other pulley half toward the spring loaded pulley half. The two leg portions of the guide channel are connected by a reverse bend. A plurality of engaging, substantially rigid members, such as steel balls or the like are slidably disposed in the guide channel and are in operative engagement with each pulley half. When one pulley half is moved toward one end of the shaft, it forces the steel balls to slide around the reverse bend and push the other pulley half toward the opposite end of the shaft.

Each embodiment of the invention provides for positive adjustment of each pulley half to vary the effective pitch diameter of the pulley and automatically maintain proper belt alignment. The positive adjustment which is provided for each pulley half also makes it possible to attain uniform loading and pressure engagement between the belt and the opposed faces of the pulley halves. As a result, belt wear due to improper loading and slippage under load has been materially reduced.

As will hereinafter become apparent, the relatively simple constructions contemplated by the invention do not include the movable mechanical parts, such as cams, racks and pinions, and so forth, which are typical of prior art variable pitch pulley constructions. As a result, the novel and improved pulley constructions are relatively inexpensive, light in weight and do not require the usual repair and replacement due to wear of the conventional pulley half adjusting mechanisms.

Another important advantage afforded by the invention is that the pulley shaft can be formed with a through bore. As a result, the pulley can be used in parallel shaft mounting wherein the mounting shaft extends in the same direction as the mounting shaft for the companion pulley and in parallel shaft mounting wherein the mounting shaft for the variable pitch pulley extends in the opposite direction from the mounting shaft of the companion pulley. The through bore of the pulley shaft also permits the pulley to be mounted intermediate the ends of a supporting shaft as is often desirable in compound speed drives.

Other objects and advantages of the invention will become apparent from the following detailed description and the accompanying drawings.

In the drawings:

FIGURE 1 is a perspective view diagrammatically illustrating the variable pitch pulley of the invention incorporated in a typical power drive between a motor and a machine;

FIGURE 2 is a cross-sectional view of the preferred embodiment showing the pulley in one position of pitch adjustment;

FIGURE 3 is a cross-sectional view similar to FIG. 2 and showing the pulley in another position of pitch adjustment;

FIGURE 4 is a fragmentary end view of the pulley taken along the line 4—4 of FIG. 2;

FIGURE 5 is a fragmentary, perspective view with portions broken away of the preferred pulley construction;

Figure 6:
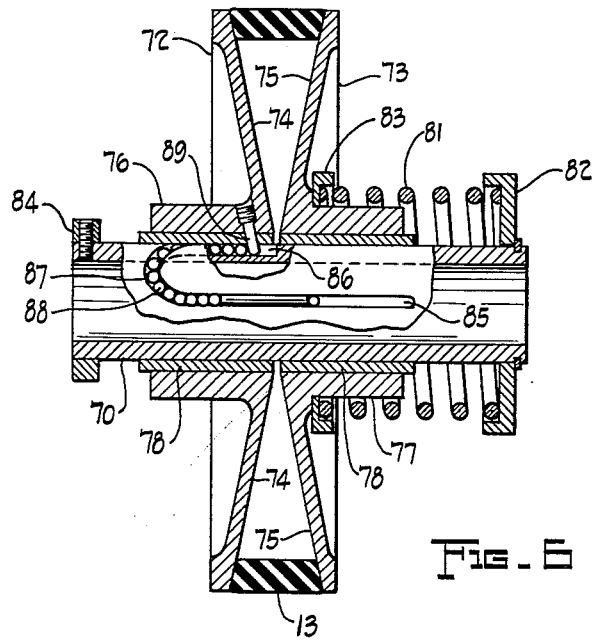
FIGURE 6 is a cross-sectional view of a modified embodiment of the invention in one position of pitch adjustment; and, FIGURE 7 is a cross-sectional view similar to FIG. 6 showing the modified pulley in a second position of pitch adjustment.

Referring now to the drawings, and to FIG. 1 in particular, there is shown a motor 10 having a drive shaft 11 on which is mounted the variable pitch pulley 12 of the invention. The variable pitch pulley 12 is drivingly connected by a V-belt 13 to a companion pulley 14 of fixed pitch diameter. The companion pulley 14 is mounted on the input shaft 15 of a machine generally designated by reference character 16.

It will be apparent that the speed at which the input shaft 15 is driven can be varied by changing the pitch diameter ratios of the pulleys 12 and 14. With the drive connection illustrated in FIG. 1, this change in the ratio of pitch diameters is effected by varying the center distance between the shafts 11 and 15. To this end, the motor 10 is mounted on a sliding base 17. This sliding base 17 is slidably carried on guide rods 18 which are connected to a sub-base 19. A shaft 20 is threaded through the front of the sub-base 19 into rotatable connection with the sliding base and a suitable crank or wheel 21 is fixed to the free end of the threaded shaft.

As will hereinafter be more fully explained, when the handle 21 and shaft 20 are turned to move the sliding base toward the companion pulley 14, the belt is forced to a larger pitch diameter of pulley 12. Thus, the shaft 15 will be driven at an increased speed. Conversely, when the sliding base 17 is moved away from the companion pulley 14, the belt is pulled down to a smaller pitch diameter of pulley 12 so that the shaft 15 is driven at slower speeds.

Reference is now made to FIGS. 2–5 which illustrate the preferred embodiment of the pulley 12. As shown, the pulley 12 includes a hollow shaft 30 adapted to be mounted on the motor drive shaft 11. The through bore 31 of the shaft 30 may be formed with a key-way 32 to receive a key (not shown) for locking the shaft 30 to the motor drive shaft 11 against relative rotation. One or more set screws 33 may also be provided through the wall of the shaft 30 for adjustably locking the shaft on the motor drive shaft against relative axial movement.

A pair of opposed cone discs or pulley halves 34 and 35 are mounted on the shaft 30 for axial sliding movement. The pulley halves 34 and 35 have conical outer surfaces 36 and 37, respectively, which drivingly engage the sides of the V-belt 13.

As shown in the preferred embodiment of FIGS. 2–5, the pulley half 34 has a sleeve-like hub portion 40. The hub 40 includes an inner bearing sleeve 41 that is slidably engaged on the shaft 30. This inner bearing sleeve 41 is preferably a pre-lubricated, sintered alloy bushing or the like which will permit the pulley to be run for long periods of time at one speed without sticking on the shaft. A pin 42 is provided for securing the bearing sleeve or bushing 41 to the pulley half 34.

The construction of the opposed pulley half 35 is similar to the pulley half 34 and includes a sleeve-like hub portion 43 which extends in the same direction as the hub 40. As shown in FIG. 2, the hub 40 is formed with an annular recess 46 for receiving the hub 43 when the pulley halves are centered on the shaft 30. The hub 43 of the pulley half 35 also has an inner bearing sleeve or bushing 44 which is fixed to the pulley half 35 by a pin 45.

The variable pitch pulley 12 of the invention is shown as being spring loaded for maintaining correct belt tension during operation of the drive. This spring loading is effected by a plurality of fingers or levers 50 which carry a Belleville-type spring washer 51. As more fully disclosed in the copending application for "Pulleys" of William C. Prior, Serial No. 173,625, filed February 16, 1962, the lever fingers 50 have corresponding ends radially disposed about one end of the shaft 30 and abutting a resilient washer 52. The fingers and washer are held on the shaft by a collar 53. The opposite ends of the lever fingers peripherally engage the pulley half 35 so that it is urged toward the center of the shaft 30. The spring washer 51 acts to maintain constant biasing pressure against the pulley half 35 in any position of axial adjustment so as to minimize belt wear.

While the structure for loading the pulley half 35 has been shown as including a Belleville-type spring washer, it will be understood that other biasing means can be employed if desired. For example, the pulley half 35 could be loaded by a conventional coil spring, as illustrated in connection with the modified pulley structure in FIGS. 6 and 7.

As generally discussed above, the pulley half 34 is connected to the pulley half 35 for equal and opposite sliding movement on the shaft 30. To this end, the shaft 30 is formed with a guide channel on its outer surface. As shown most clearly in FIG. 5, the guide channel has a first leg portion 54 which extends from beneath the bushing 44 of the pulley half 35 in a direction away from the opposed pulley half 34, and a second leg portion 55 which extends from beneath the guide bushing 41 of the pulley half 34 toward the pulley half 35. The leg portions 54 and 55 of the guide channel are spaced circumferentially of the shaft 30 and are connected by a reverse bend 56. As shown, the reverse bend 56 of the guide channel is formed in the end portion of the shaft 30 on which the spring loaded pulley half 35 is slidably mounted.

A force-transmitting cable 57 is slidably disposed in the guide channel. One end of this force-transmitting cable 57 is connected to the pulley half 35 along the leg portion 54 of the guide channel. This connection may be effected by a cable-receiving ferrule 58 which is carried by the hub portion of the pulley half 35. The opposite end of the cable 57 is connected to the pulley half 34 along the leg 55 of the guide channel by a similar ferrule 59.

In operation, the lever fingers 50 and the connected spring washer 51 urge the pulley half 35 toward the center of the shaft 30 by a constant biasing pressure. Thus, when the center distance between the motor shaft 11 and the pulley shaft 15 is decreased, as by adjusting the sliding motor base 17, the pulley half 35 will slide toward the center of the shaft. This automatic centering movement of the pulley half 35 pulls the force-transmitting cable 57 in the guide channel around the reverse bend 56 so that the pulley half 34 is also pulled toward the center of the shaft. As illustrated in FIG. 2, the V-belt 13 is forced radially outwardly by the cooperative centering movement of the pulley halves 34 and 35 to thereby increase the effective pitch diameter of the pulley 12. Inasmuch as the pulley halves are positively connected by the cable 57, the pulley halves will be moved in equal amounts so that the V-belt is maintained in driving alignment with the companion pulley 14.

Referring now to FIG. 3, it will be seen that, when the center distance of the pulleys is increased, as by sliding the drive shaft 11 away from the driven shaft 15, the V-belt 13 will be pulled radially inwardly of the pulley 12. This action slides the pulley half 34 away from its center position illustrated in FIG. 2. Simultaneously, the force-transmitting cable is pulled around the reverse bend of the guide channel to pull the opposed pulley half 35 toward the opposite end of the shaft against the biasing action of the spring washer 51. In this latter position of adjustment, the driven speed of the companion pulley 14 is decreased.

It will thus be apparent that the action of the force-transmitting cable 57 maintains the belt 13 in constant alignment between the pulleys 12 and 14. As noted above, this constant alignment decreases belt wear. Another advantage is that a V-groove companion pulley 14 of fixed pitch diameter can be used with the variable speed pulley 12.

Figure 7:
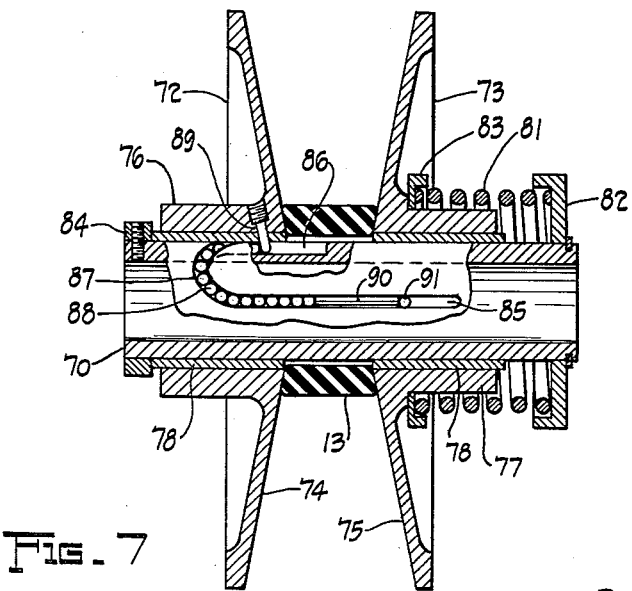

Reference is now made to FIGS. 6 and 7 which illustrate a modified embodiment of the invention. As here shown, the variable pitch pulley includes a hollow shaft 70 which corresponds to the shaft 30 of the preferred embodiment. A pair of opposed pulley halves 72 and 73 having conical belt driving surfaces 74 and 75, respectively, are mounted on the shaft 70 for axial sliding movement. The pulley halves 72 and 73 may be formed to have hub portions 76 and 77, respectively, which extend toward opposite ends of the shaft 70. Each hub portion 76 and 77 is shown as including a pre-lubricated, sintered alloy bushing 78 which is in slidable contact with the shaft.

In the modified embodiment of the invention, a coil spring 81 is provided for urging the pulley half 73 toward the center of the shaft. This coil spring 81 is shown as being disposed between an end plate 82 connected to one end of the shaft 70 and a plate 83 which is fixed to the hub portion 77 of the pulley half 73. A collar 84 is secured to the opposite end of the shaft 70 for preventing the pulley half 72 from sliding from the end of the shaft.

The shaft 70 is formed with a guide channel on its outer surface, the guide channel being generally similar to the guide channel described in connection with the preferred embodiment of the invention. In this modified embodiment, however, the guide channel has a leg 85 which extends from beneath the pulley half 73 toward the opposed pulley half 72 and a second leg portion 86 which extends from beneath the pulley half 72 away from the pulley half 73. The two leg portions 85 and 86 are connected by a reverse bend 87. As will be seen in FIGS. 6 and 7, this reverse bend 87 is formed in the end portion of the shaft 70 on which the pulley half 72 is mounted.

A train of engaging, substantially rigid members 88 is disposed in the guide channel. These members 88 may conveniently be steel balls or the like which are slidable in the guide channel. The hub 76 of pulley half 72 carries a finger 89 which extends into the leg 86 of the channel and engages one end of the train of members 88.

A rigid cylinder 90 or the like is slidably disposed in the guide channel at the opposite end of the train of members 88. This cylinder 90 is engaged by a finger 91 which is carried by the pulley half 73 in a manner similar to the finger 89.

In operation, sliding movement of the pulley half 73 toward the center of the shaft 71 causes the finger 91 to move in the guide channel leg 85 toward the reverse bend 88. This movement of the finger 91 pushes against the cylinder 90 and forces the train of members 88 to slide around the reverse bend and push against the finger 89. As a result, the pulley half 72 is moved toward the center of the shaft. Conversely, when the center distance between pulleys 12 and 14 is increased to force the pulley halves 72 and 73 apart (FIG. 7), the pulley half 72 will slide toward the collar 84. This causes the finger 89 to move in the guide channel leg 86 toward the reverse bend 87 and to push the train members around the reverse bend. The finger 91 of the pulley half 73 is thus moved toward the terminating end of the channel leg 85 to cause corresponding and equal movement of the pulley half 73 away from the center of the shaft.

Although both embodiments of the variable pitch pulley of the invention have been described in connection with a variable speed drive having relatively movable motor and driven shafts, it will be understood that this particular drive is not limiting of the invention and has been chosen only for the purposes of clearly describing one conventional environment in which the novel pulley construction can be used to advantage. For example, the sliding motor base can be eliminated by using driving and driven variable pitch pulleys embodying the invention. This permits the drive to operate on fixed shaft centers and affords infinite speed variation within the wide ratio range of the effective pitch diameters of the pulleys.

Many additional modifications and variations of the invention will be apparent to those skilled in the art in view of the foregoing detailed disclosure. Therefore, it is to be understood that, within the scope of the appended claims, the invention may be practiced otherwise than as specifically shown and described.

What is claimed is:

1. A variable pitch pulley comprising a shaft, opposed pulley halves mounted on said shaft for axial sliding movement, and means carried by said shaft in engagement with said pulley halves for causing equal and opposite sliding movement thereof, said means including force-transmitting means operatively connected at opposite ends to said pulley halves, and means guiding said force-transmitting means for sliding movement along a path of travel defining a reverse bend between the ends of said force transmitting means, whereby sliding movement of one pulley half in one direction will slide said force-transmitting means around said reverse bend to move the other pulley half in the opposite direction.

2. A variable pitch pulley comprising a shaft, a pair of opposed pulley halves mounted on said shaft for axial sliding movement, biasing means connected to said shaft and in engagement with one pulley half for slidably urging it toward the center of said shaft, and means carried by said shaft for producing corresponding sliding movement of the other pulley half toward the center of said shaft, said means including force transmitting means operatively connected to each pulley half in regions spaced circumferentially of said shaft, and means guiding said force transmitting means for sliding movement along a path of travel having a reverse bend between said regions of connection.

3. A variable pitch pulley comprising a hollow shaft, a pair of opposed pulley halves mounted on said shaft for axial sliding movement, said shaft being provided with a guide channel, said guide channel having portions spaced circumferentially of said shaft and a reverse bend connecting said circumferentially spaced portions, and force-transmitting means disposed in said channel for effecting equal and opposite sliding movement of said pulley halves, said force-transmitting means being connected to one pulley half along one portion of said channel and to the other pulley half along the other portion of said channel.

4. A variable pitch pulley comprising a shaft, a pair of opposed pulley halves mounted on said shaft for axial sliding movement; said shaft having a guide channel formed in its outer surface; said guide channel having a first leg portion extending from one end portion of said shaft to the opposite end portion of said shaft, a reverse bend in said opposite end portion, and a second leg portion extending from said reverse bend toward said one end portion of said shaft; and force-transmitting means disposed in said channel for sliding movement, said force-transmitting means being connected to one pulley half along the first leg of said channel and to the other pulley half along the second leg of said channel, whereby sliding movement of one pulley half in one direction will slide said force-transmitting means around said reverse bend to correspondingly slide the other pulley half in the opposite direction.

5. A variable pitch pulley as claimed in claim 4 wherein said force-transmitting means comprises flexible cable means.

6. A variable pitch pulley as claimed in claim 4 wherein said force-transmitting means comprises a train of engaging, substantially rigid elements.

7. A variable pitch pulley comprising a hollow shaft; a pair of opposed pulley halves mounted on said shaft for axial sliding movement; biasing means on said shaft in engagement with one pulley half for urging it toward the center of said shaft; said shaft having a channel formed in its outer surface, said channel having a first leg extending from beneath said one pulley half away from the other pulley half, a second leg extending from beneath said other pulley half toward said one pulley half and a reverse bend connecting said first and second legs; and a cable guided for sliding movement in said channel, said cable being connected to said one pulley half along the first leg of said channel and to said other pulley half along the second leg of said channel, whereby movement of said one pulley half toward the center of said shaft will pull the cable around said reverse bend to correspondingly move said other pulley half toward the center of said shaft.

8. A variable pitch pulley comprising a hollow shaft; a pair of opposed pulley halves mounted on said shaft for axial sliding movement; biasing means on said shaft in engagement with one pulley half for urging it toward the center of said shaft; a channel formed in the outer surface of said shaft, said channel having a first leg extending from beneath said one pulley half toward the opposite end of said shaft, a second leg spaced from said first leg circumferentially of said shaft and a reverse bend connecting said legs; and a train of engaging, substantially rigid elements slidably disposed in said channel, said elements being engaged by said one pulley half along the first leg of said channel and by the other pulley half along the second leg of said channel, whereby movement of said one pulley half toward the center of said shaft will push said elements around said reverse bend to correspondingly move the other pulley half toward the center of said shaft.

References Cited in the file of this patent

UNITED STATES PATENTS

| | | |
|---|---|---|
| 2,850,913 | Lewellen et al. | Sept. 9, 1958 |
| 2,901,914 | Preston | Sept. 1, 1959 |
| 3,010,328 | Forey | Nov. 28, 1961 |